United States Patent [19]

Yoshida et al.

[11] Patent Number: 5,065,410

[45] Date of Patent: Nov. 12, 1991

[54] METHOD AND ARRANGEMENT FOR SETTING AN AMPLITUDE EQUALIZATION CHARACTERISTIC ON AN EQUALIZER FOR USE IN A MODEM

[75] Inventors: Atsushi Yoshida; Tsutomu Hosokawa, both of Tokyo; Masanori Hattori, Shizuoka, all of Japan

[73] Assignee: NEC Corporation, Japan

[21] Appl. No.: 284,089

[22] Filed: Dec. 14, 1988

[30] Foreign Application Priority Data

Dec. 15, 1987 [JP] Japan .................................. 62-315224
Nov. 7, 1988 [JP] Japan .................................. 63-279415

[51] Int. Cl.⁵ ........................ H04L 27/08; H04B 3/04
[52] U.S. Cl. ....................................... 375/98; 375/12; 333/16; 333/18; 333/28 R
[58] Field of Search ...................... 375/11, 12, 36, 98, 375/14; 333/16–18, 28 R; 379/394, 398

[56] References Cited

U.S. PATENT DOCUMENTS

| | | | |
|---|---|---|---|
| 3,335,223 | 8/1967 | Johannesson et al. | 375/12 |
| 3,758,881 | 9/1973 | Rummler | 375/12 |
| 3,775,688 | 11/1973 | Hiroshita et al. | 375/12 |
| 4,003,006 | 1/1977 | Mandeville et al. | 375/12 |
| 4,315,319 | 2/1982 | White | 375/12 |
| 4,621,355 | 11/1986 | Hirosaki et al. | 375/12 |
| 4,768,204 | 8/1988 | Zeiss | 375/12 |

Primary Examiner—Douglas W. Olms
Assistant Examiner—Ralph Smith
Attorney, Agent, or Firm—Ostrolenk, Faber, Gerb & Soffen

[57] ABSTRACT

An equalizer characteristic of an amplitude equalizer for use in a modulating and demodulating device (MODEM) can be set with considerable ease. One of a plurality of equalization characteristics assigned to an amplitude equalizer is set by generating and feeding to a transmission line a plurality of reference signals at the same level but with respectively-different frequencies. Each of such respective reference signals are received from the transmission line, separated, and measured as to its reception level. Level errors are then determined between each measured reception level and an estimated reception level previously determined in association with a respective one of the equalization characteristics. A selection and setting is then made of one of the equalization characteristics that is associated with one of the estimated receptions levels having the smallest level error.

12 Claims, 5 Drawing Sheets

FIG. 5

| ADDRESS $A_4 A_3 A_2 A_1 A_0$ | CONTENT | NOTE |
|---|---|---|
| 0 0 0 0 0 | $\tilde{X}04$ | ESTIMATED VALUES BY 1ST EQUALIZER CHARACTERISTIC |
| 0 0 0 0 1 | $\tilde{X}03$ | |
| 0 0 0 1 0 | $\tilde{X}02$ | |
| 0 0 0 1 1 | $\tilde{X}01$ | |
| 0 0 1 0 0 | $\tilde{X}00$ | |
| 0 0 1 0 1 | 0* | |
| 0 0 1 1 0 | $\tilde{X}14$ | ESTIMATED VALUES BY 2ND EQUALIZER CHARACTERISTIC |
| 0 0 1 1 1 | $\tilde{X}13$ | |
| 0 1 0 0 0 | $\tilde{X}12$ | |
| 0 1 0 0 1 | $\tilde{X}11$ | |
| 0 1 0 1 0 | $\tilde{X}10$ | |
| 0 1 0 1 1 | 0* | |
| 0 1 1 0 0 | $\tilde{X}24$ | ESTIMATED VALUES BY 3RD EQUALIZER CHARACTERISTIC |
| 0 1 1 0 1 | $\tilde{X}23$ | |
| 0 1 1 1 0 | $\tilde{X}22$ | |
| 0 1 1 1 1 | $\tilde{X}21$ | |
| 1 0 0 0 0 | $\tilde{X}20$ | |
| 1 0 0 0 1 | 0* | |
| 1 0 0 1 0 | $\tilde{X}34$ | ESTIMATED VALUES BY 4TH EQUALIZER CHARACTERISTIC |
| 1 0 0 1 1 | $\tilde{X}33$ | |
| 1 0 1 0 0 | $\tilde{X}32$ | |
| 1 0 1 0 1 | $\tilde{X}31$ | |
| 1 0 1 1 0 | $\tilde{X}30$ | |
| 1 0 1 1 1 | 0* | |
| 1 1 0 0 0 | $\tilde{X}44$ | ESTIMATED VALUES BY 5TH EQUALIZER CHARACTERISTIC |
| 1 1 0 0 1 | $\tilde{X}43$ | |
| 1 1 0 1 0 | $\tilde{X}42$ | |
| 1 1 0 1 1 | $\tilde{X}41$ | |
| 1 1 1 0 0 | $\tilde{X}40$ | |

*THIS DATA WILL READ OUT WHEN SHIFT REGISTER 402 HAS CLEARED

METHOD AND ARRANGEMENT FOR SETTING AN AMPLITUDE EQUALIZATION CHARACTERISTIC ON AN EQUALIZER FOR USE IN A MODEM

BACKGROUND OF THE INVENTION

The present invention relates to a method and arrangement for setting an equalization characteristic of an amplitude equalizer for use in a modulating and demodulating device (hereinafter referred to as MODEM).

Generally, a MODEM includes an amplitude equalizer having a plurality of different amplitude equalization characteristics one of which is selected in matching relation to a particular communication line connected to the MODEM. It has been customary to select an optimum characteristic for a particular communication line by adopting one of two different approaches: first in the event of installation of a MODEM a technical expert connects a transmission characteristic measuring device or similar device to opposite ends of the line to which a MODEM is to be connected and thereby determines an optimum equalization characteristic for that line second, a person actually causes a MODEM to operate while observing the resulting eye pattern on an oscilloscope or the like and selects an equalization characteristic which makes the eye opening associated with the quality of transmission characteristic largest. Both of these prior art approaches share the problem or requiring an expert to be dispatched to the actual location of installation, and of requiring a special device for measurement.

SUMMARY OF THE INVENTION

It is therefore an object of the present invention to provide a method and arrangement that allows an equalization characteristic of an amplitude equalizer for use in a MODEM to be set with ease.

An arrangement for selecting and setting one of a plurality of equalization characteristics assigned to an amplitude equalizer of the present invention comprises a reference signal generator for generating a plurality of reference signals each having a different predetermined frequency and sending the reference signals to a transmission line. A separating circuit separates the respective reference signals received over the transmission line. A level detector measures a reception level of each of the separated reference signals. An error detector detects a level of errors between the measured reception levels and estimated reception levels, each being determined beforehand in association with a respective one of the equalization characteristics. A selecter selects one of the equalization characteristics that is associated with one of the estimated reception levels having the smallest level error.

BRIEF DESCRIPTION OF THE DRAWINGS

The above and other objects, features and advantages of the present invention will become more apparent from the following detailed description when taken with the accompanying drawings, in which:

FIG. 5 is a table exemplarily listing data which may be stored in a read only memory of FIG. 3.

DETAILED DESCRIPTION OF THE PREFERRED EMBODIMENTS

Figure 1:
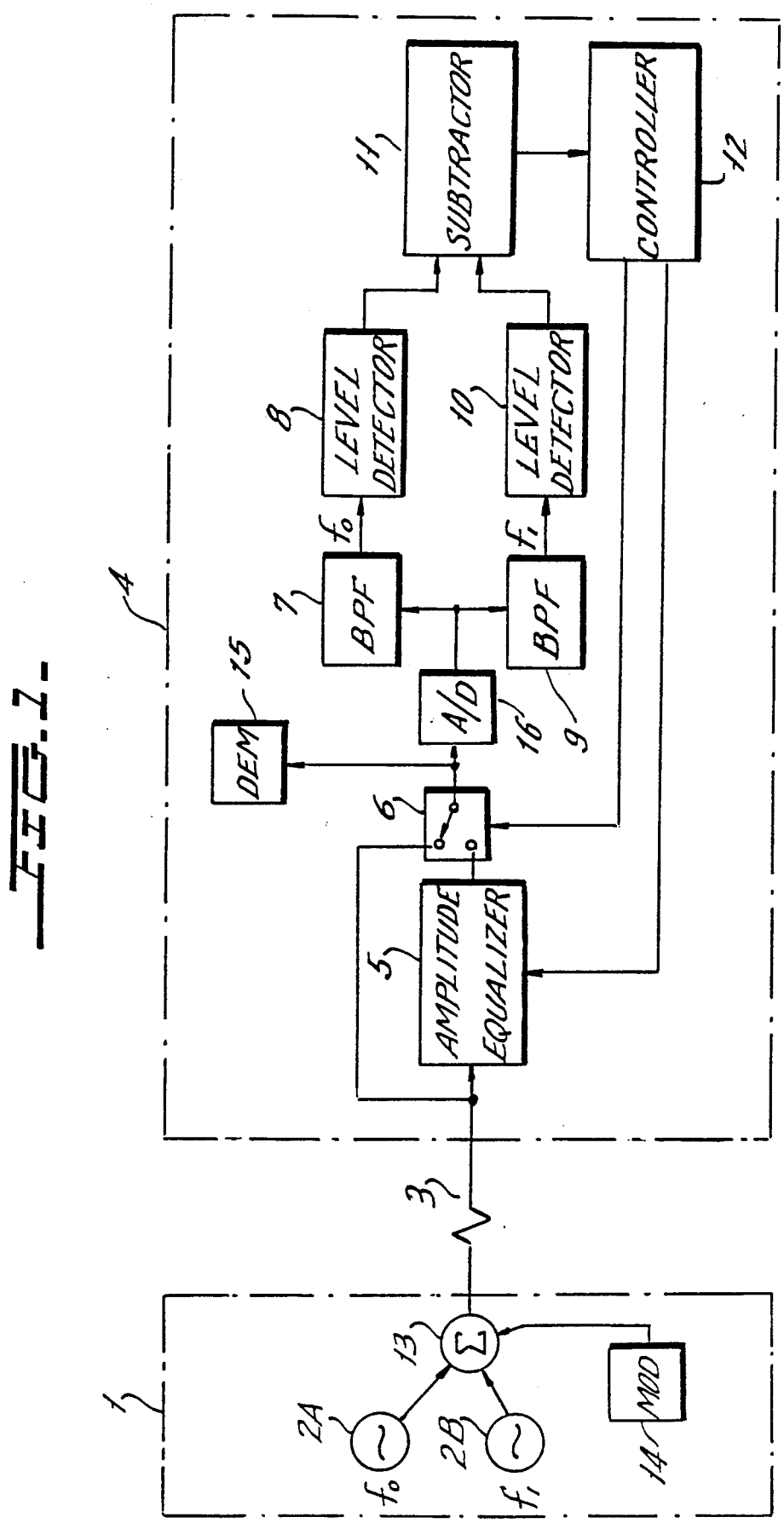
FIG. 1 is a schematic block diagram showing a first embodiment of the present invention.

Referring to FIG. 1 of the drawings, an arrangement for setting an amplitude equalization characteristic embodying the present invention is shown. In the figure, a first MODEM 1 and a second MODEM 4 are interconnected by a transmission line 3. While these MODEMs 1 and 4 are constructed and arrangement in exactly the same manner as each other, only those structural elements that are essential for setting an equalization characteristic are illustrated. The first MODEM 1 includes reference signal generators 2A and 2B for generating reference signals having the same signal level and respective frequencies of $f_0$ and $f_1$ that are used to select a particular amplitude equalization characteristic. These reference signals are added by an adder 13 and the resulting signal is sent to the transmission line 3 in the form of a transmission characteristic measuring (TCM) signal. At this instant, a modulating section 14 also included in the first MODEM 1 remains inoperative. The TCM signal received at the second MODEM 4 is applied to an amplitude equalizer 5 having a plurality of different equalization characteristic as well as to a switch 6. The amplitude equalizer 5 is operable to equalize an input signal on the basis of a single equalization characteristic that is selected beforehand out of a group of different characteristics, thereby producing an equalized TCM signal. The switch 6 selects one of the equalized and the non-equalized TCM signals. More specifically, the switch 6 is so controlled as to select the non-equalized TCM signal when an equalization characteristic is to be set, as described in detail later. The non-equalized TCM signal selected by the switch 6 is applied to an analog-to-digital (A/D) converter 16 to be thereby converted into a digitized TCM signal. This digitized TCM signal is fed to first and second bandpass filters (BPF's) 7 and 9, respectively. The first and second BPF's 7 and 9 separate respectively the reference signals having frequencies $f_0$ and $f_1$ from the digitized TCM signal and deliver them to first and second level detectors 8 and 10, respectively. The level detectors 8 and 10 each determines a level of the separated reference signal and applies it to a subtractor 11. In response, the subtractor 11 determines a difference or error between the two reference signal levels and then supplies it to a controller 12. Implemented by a microprocessor, the controller 12 selects a particular equalization characteristic of the amplitude equalizer 5 that is suitable for the level difference. More specifically, the controller 12 selects one of a plurality of amplitude equalizers each having a different equalization characteristic in matching relation to the level difference. Further, the controller 12 performs necessary controls associated with the measurement of a characteristic as will be described. At this stage of operation, a demodulating section 15 of the second MODEM 4 does not operate as the modulating section 14 of the first MODEM 1.

In detail, a control circuit built in the first MODEM 1 sends a transmission start signal to the second MODEM 4 prior to the TCM signal by using, for example, a so-called secondary channel which does not lie in the data transmission band. In the second MODEM 4, a bandpass filter (not shown) adapted for the separation of the transmission start signal delivers a characteristic setting start signal to the controller 12 as soon as it receives the transmission start signal. Upon reception of such a signal, the controller 12 controls the switch 6 to be in the position shown in FIG. 1 so that a TCM signal from the MODEM 1 may be directly applied to the A/D converter 16, by-passing the amplitude equalizer 5. At the same time, the controller 12 returns an acknowledge (ACK) signal to the MODEM 1 over the secondary channel for thereby allowing the latter to transmit the TCM signal. The transmission and reception of a transmission start signal and the return of an ACK signal described above are programmed in the controller 12. These procedures are well known in the art and therefore will not be discussed further.

Upon reception of the ACK signal, the first MODEM 1 causes the reference signal generators 2A and 2B to generate the reference signals whose frequencies are $f_0$ and $f_1$, respectively. The adder 13 adds the two reference signals and delivers the resulting composite signal to the transmission line 3 as the TCM signal. The TCM signal undergoes attenuation due to losses which are particular to the transmission line 3 before reaching the second MODEM 2. Then, the TCM signal is applied to the A/D converter 16 via the switch 6 and therefrom to the BPF's 7 and 9, as stated earlier. The BPF 7 separates the reference signal of frequency $f_0$ while the BPF 9 separates the other reference signal of frequency $f_1$. The outputs of the BPF's 7 and 9 are fed to the level detectors 8 and 10, respectively. Levels of the reference signals individually determined by the level detectors 8 and 10 are applied to the subtractor 11 with the result that an error or difference between the two levels is delivered to the controller 12. In response, the controller 12 selects a particular amplitude equalizer the equalization characteristic of which matches with the level difference. Losses ascribable to a transmission line increase with the frequency, as generally accepted. Hence, the gain of the equalization characteristic increases with the frequency.

Figure 2:
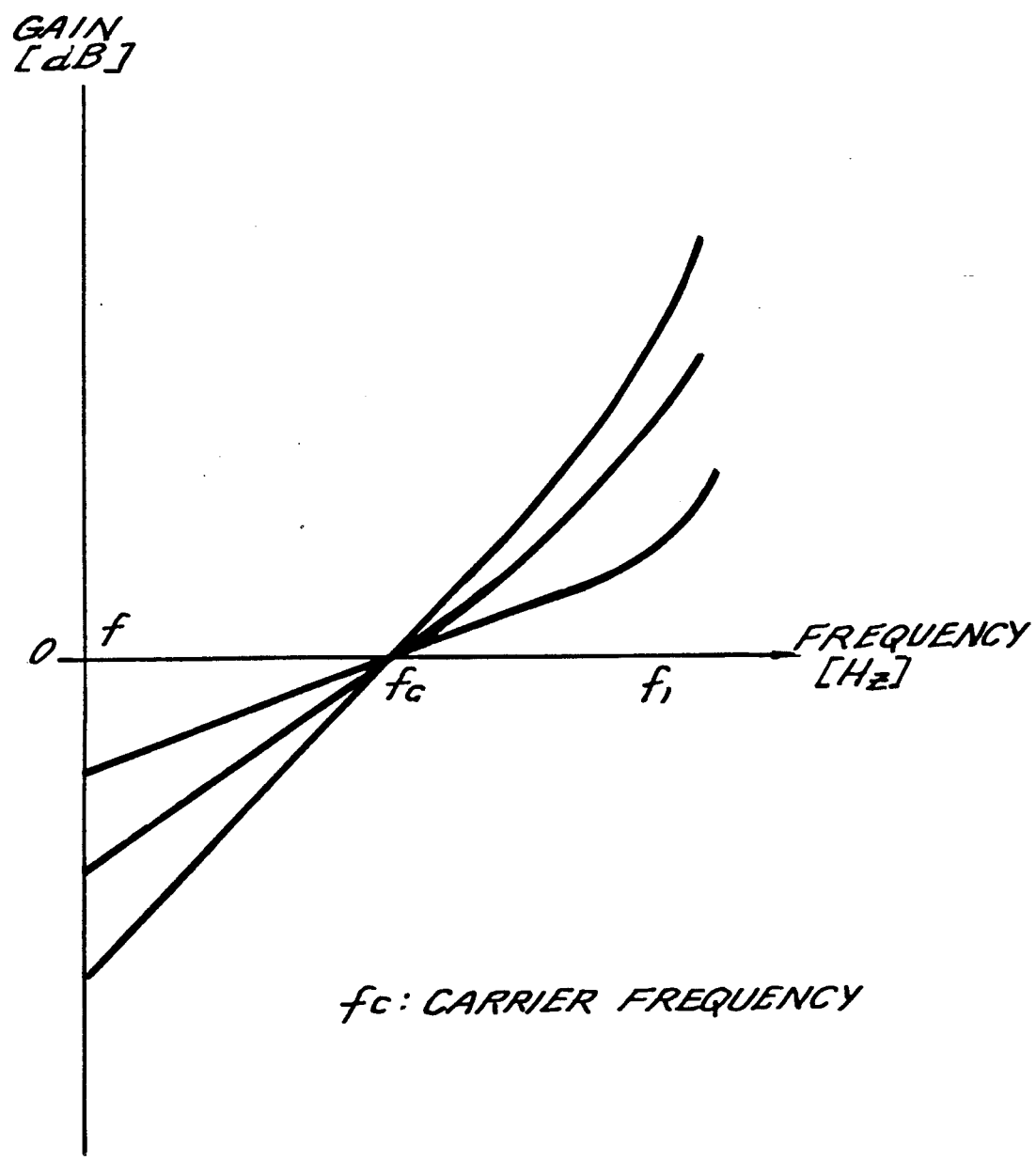
FIG. 2 is a plot representative of equalization characteristics achievable with an amplitude equalizer shown in FIG. 1.

FIG. 2 is a plot showing specific equalization characteristics of an amplitude equalizer. Since the plot shown in the figure adopts the level of a carrier frequency fc applicable to data transmission for a reference, the characteristic is such that the gain is increased for the frequencies higher than the carrier frequency and decreased for the frequencies lower than the same. Considering the fact that the losses from which a signal suffers depend upon, among other factors, the length of a transmission line, use is made of a plurality of amplitude equalizers each having a predetermined equalization characteristic so that an optimum one of such characteristics may be selected. In this particular embodiment, the controller 12 is provided with an internal table so that it may selectively set an equalization characteristic in matching relation to an output of the subtractor 11. As soon as the controller 12 sets an optimum equalization characteristic as stated, it actuates the switch 6 into connection with the amplitude equalizer 5 and, at the same time, causes the first MODEM 1 to stop generating the reference signals by using the secondary channel. Alternatively, the first MODEM 1 may be provided with a timer to automatically stop generating the reference signals when a given period of time necessary for the second MODEM 4 to set a characteristic of the amplitude equalizer 5 expires. Which of the equalization characteristics has been selected may be stored in the form of data in a nonvolatile memory or similar storage which is built in any of the controller 12 and the amplitude equalizer 5. If the difference between the frequencies $f_0$ and $f_1$ of the reference signals is excessively small, accurate selection of an optimum equalization characteristic will fail. Conversely, if the difference is larger than the data transmission band, the difference itself will become meaningless because it does not reflect the characteristic in the transmission band. In the light of this, the frequencies $f_0$ and $f_1$ are respectively selected from relatively high and relatively low frequencies that lie in the data transmission band, e.g. Nyquist frequencies. Assuming a MODEM whose modulation rate is 2400 [baud] as prescribed in CCITT Recommendation V.29, for example, the carrier frequency is 1700 [Hz] and therefore the reference signals $f_0$ and $f_1$ are respectively selected to be 500 [Hz] and 2900 [Hz], which are the Nyquist frequencies.

Figure 3:
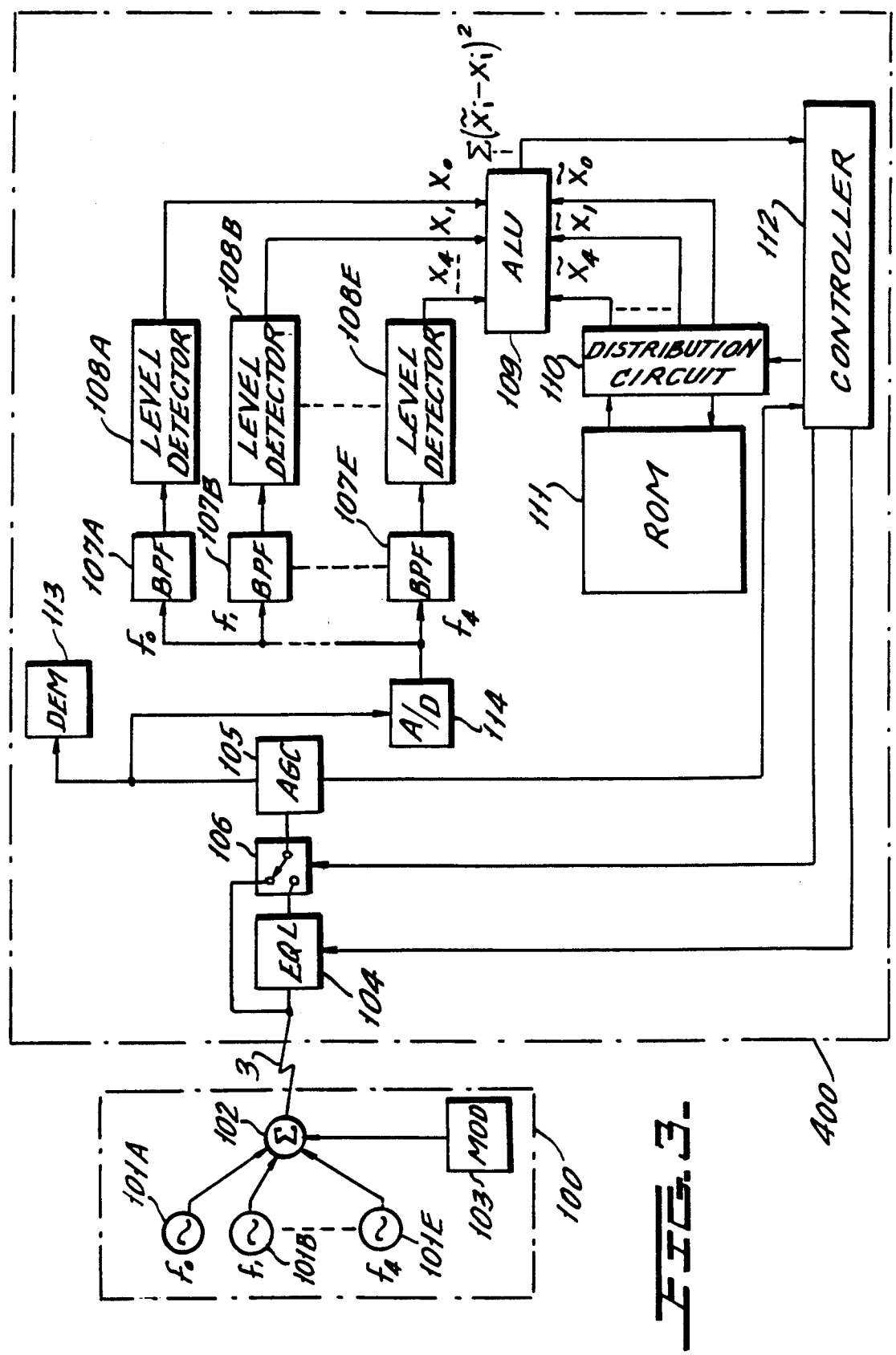
FIG. 3 is a block diagram schematically showing a second embodiment of the present invention.

Referring to FIG. 3, an alternative embodiment of the present invention is shown. While the embodiment of FIG. 1 selects a particular equalization characteristic on the basis of a level difference or error between two reference signals, the alternative embodiment uses more than two reference signals to promote more accurate selection of an equalization characteristic.

In FIG. 3, a first MODEM 100 and a second MODEM 400 are interconnected by a transmission line 3. While the first MODEM 100 sends a transmission characteristic measuring (TCM) signal, the second MODEM 400 selects and sets a particular equalization characteristic of an amplitude equalizer 104 in response to the TCM signal. Such a general configuration is the same as that of the first embodiment. Again, those portions of the arrangement of FIG. 3 that are irrelevant to the illustrative embodiment are not shown.

In this particular embodiment, the first MODEM 100 includes five oscillators 101A to 101E for generating reference signals which have frequencies $f_0$ to $f_4$ at the same signal level, respectively. The MODEM 100 further includes an adder 102 for generating the TCM signal by adding the five reference signals. A modulating section 103 remains inoperative when the TCM signal is sent from the MODEM 100 to the MODEM 400.

As in the embodiment of FIG. 1, a control circuit (not shown) included in the first MODEM 100 sends a transmission start signal to the second MODEM 400 to control a switch 106 so as to by-pass an amplitude equalizer 104 while a controller 112 sends back an acknowledge ("ACK") signal to the first MODEM 100. In response to the ACK signal, the control circuit of the first MODEM 100 activates a predetermined one of five reference signal generators 101A to 101E (for instance, 101B) to send a reference signal having frequency $f_1$ as a gain setting signal. This gain setting signal is fed to an automatic gain control (AGC) circuit 105 which controls its gain to regulate the gain setting signal to a predetermined level. The AGC circuit 105 informs the controller 112 of the end of the gain setting. In response to the end of the gain setting, the controller 112 requests the first MODEM 100 to send reference signals for amplitude equalization characteristic selection.

Upon reception of the request signal, the first MODEM 100 causes the reference signal generators 101A to 101E to generate the reference signals whose frequencies are $f_0$ to $f_4$, respectively. The adder 102 adds the five reference signals and delivers the resulting composite signal to the transmission line as a transmission characteristic measuring (TCM) signal. The TCM signal undergoes attenuation due to losses that are particular to the transmission line before reaching the second MODEM 400. Then, the TCM signal is applied to the AGC 105 via the switch 106. The AGC circuit 105 controls the signal level of the TCM signal in accordance with the gain which is previously set, and thereby normalizes the TCM signal with the reference signal of the frequency $f_1$. An A/D converter 114 converts the TCM signal into a digitized TCM signal, which is then applied to BPF's 107A to 107E, each being assigned to a different reference signal. In FIG. 3, the BPF's 107A to 107E are adapted to separate the frequencies $f_0$ to $f_4$, respectively. Level detectors 108A to 108E are respectively associated with the BPF's 107A to 107E to determine the levels of the reference signals that are separated by the BPF's 107A to 107E. More specifically, the reference signals outputted by the level detectors 108A to 108E have respective reception levels $X_0$ to $X_4$ which may be regarded as having been normalized by the reception level $X_1$ of the frequency $f_1$ in the AGC circuit 105.

A read only memory (ROM) 111 internally stores inverse characteristics of the equalization characteristics particular to the amplitude equalizer 104, i.e., estimated reception levels each of which is associated with a respective one of the frequencies of the reference signals. A distribution circuit 110 is controlled by the controller 112 to read the estimated reception levels each of which is associated with an equalization characteristic from the ROM 111 and to deliver them to an arithmetic logic circuit (ALU) 109 in the form of estimated reception levels $X_0$ to $X_4$. Also applied to the ALU 109 are the actual reception levels $X_0$ to $X_4$ which are received from the level detectors 108A to 108E, respectively. In response, the ALU 109 produces a difference between the actual reception levels $X_0$ to $X_4$ and their associated estimated reception levels $X_0$ to $X_4$ as expressed by $\Sigma_i(X_i - X_i)^2$, the difference being fed to the controller 112. The controller 112 controls the distribution circuit 110 to sequentially read the estimated reception levels each of which is associated with a different one of the second to the n-th equalization characteristics from the ROM 111. The ALU calculates the difference between them again. The controller 112 stores all the differences associated with the first to n-th characteristics, delivers a command to the amplitude equalizer 104 for selecting one of the equalization characteristics which corresponds to the estimated reception level having the smallest difference, and causes the switch 106 to connect with the amplitude equalizer 104.

Figure 4:
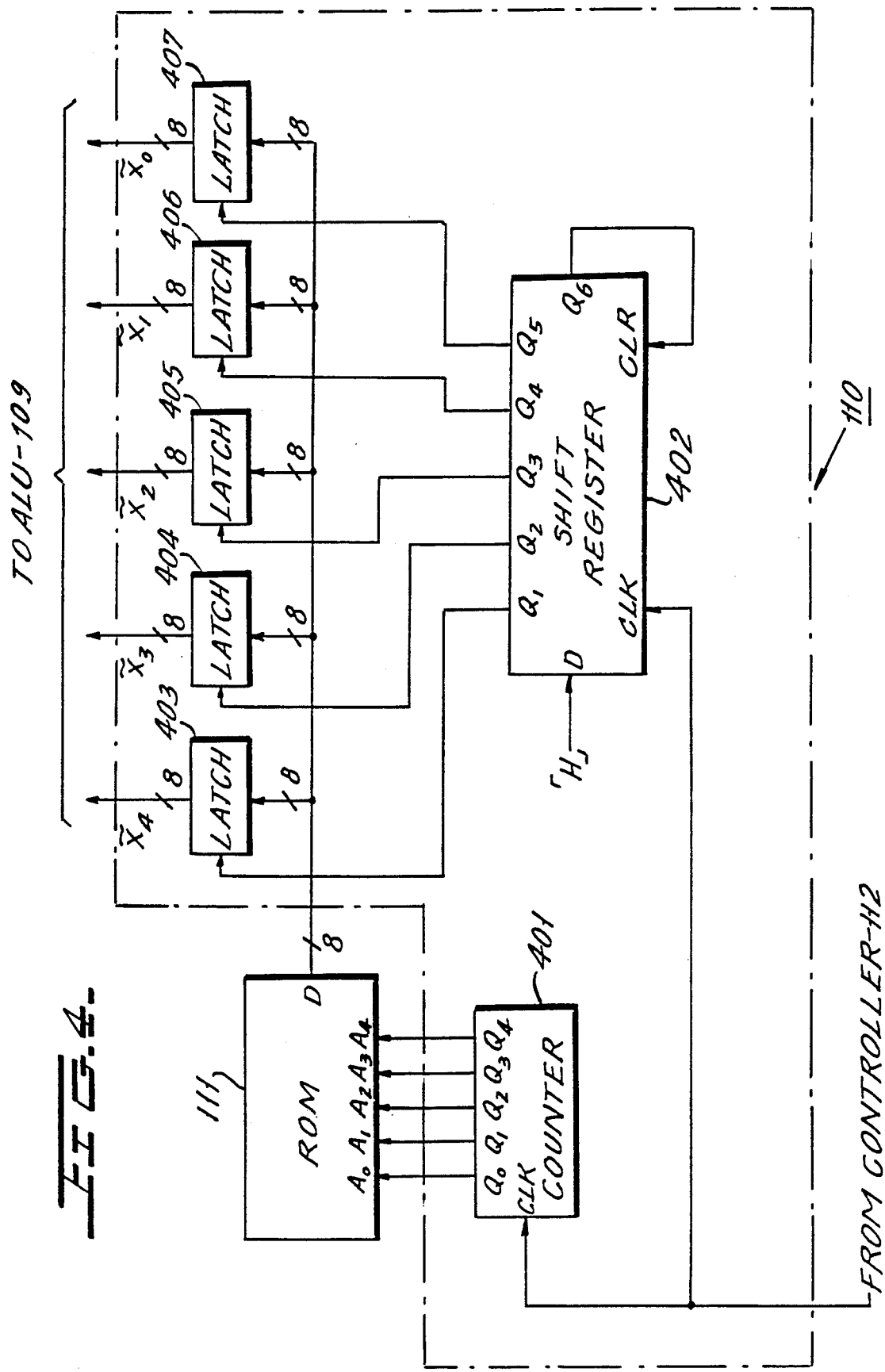
FIG. 4 is a block diagram schematically showing a specific construction of a distribution circuit which is included in the arrangement of FIG. 3.

Referring to FIG. 4, a specific construction of the distribution circuit 110 is shown. As shown, the circuit 110 includes a counter 401 for generating addresses for the ROM 111, five latch circuits 403 to 407 connected to a data bus of the ROM 111, and a shift register 402 for feeding a data load signal to the latch circuits 403 to 407. In the figure, each reception level is represented by eight bits by way of example. The counter 401 is incremented by a clock fed from the controller 112 while delivering its value as an address to address input terminals of the ROM 111. Simultaneously with the address from the counter 401, a read enable pulse is applied to the ROM 111 so that a content of the address designated by the counter 401 is read out. Only one data can be read out of the ROM 111 in response to one read enable. Hence, when five different reference signals are used as in this embodiment, the readout has to be repeated five consecutive times before the ALU 109 produces the difference signal. The five latch circuits 403 to 407 serve to hold data until such five times of read-out is completed. The shift register 402 determines which of the latch circuits 403 to 407 should latch which of the data read out of the ROM 111. The clock fed to the counter 401 is also fed to the shift register 402 from the controller 112. A data terminal D of the shift register 402 is permanently held at a high level while the sixth bit output Q6 of the shift register 402 is connected to a clear terminal CLR of the shift register 402. The latch circuits 403 to 407 each receives data from the ROM 111 at the instant when the data load signal fed thereto from the shift register 402 turns from a low level to a high level. In FIG. 4, since the data input terminal D of the shift register 402 is fixed at a high level as stated above, outputs Q1 to Q5 of the shift register 402 sequentially become a high level. Hence, all the outputs Q1 to Q5 become a high level upon the appearance of the fifth clock pulse so that data necessary for the ALU 109 to produce the difference signal are fully latched and fed to the ALU 109. The next clock pulse turns the output Q6 of the shift register 402 to a high level to thereby clear the contents of the latter. In the specific construction shown in FIG. 4, since the output Q1 of the shift register 402 controls the output $X_4$ of the latch circuit 403, it is necessary that the data $X_4$, $X_3$, $X_2$, $X_1$ and $X_0$ be written in this order in the ROM 111.

FIG. 5 exemplarily lists contents that may be written in the ROM 111. In the figure, $X_{mn}$ is representative of an estimated reception level associated with a reference signal $f_n$ ($0 \leq n \leq 4$) and produced from, among the plurality of (five in this embodiment) equalization characteristics of the amplitude equalizer 104, the (m+1)th equalization characteristic. The counter 401 is cleared when the controller 112 specifies one of the equalization characteristics of the amplitude equalizer 104. While any other correspondence between the latch circuits 403 to 407 and the outputs Q1 to Q5 of the shift register 402 and any other order of writing data in the ROM 111 may of course be contemplated, such alternative implementations will not be described herein.

In summary, the illustrative embodiments of the present invention cause the first MODEM 100 to set the equalization characteristic of the second MODEM 400, as shown and described. However, the principle of the present invention is similarly applicable to a case wherein the second MODEM 400 sets the equalization characteristic of the first MODEM 100.

It can now be appreciated that the present invention is successful in allowing a user to set an amplitude equalization characteristic of a MODEM easily without resorting to a technical expert or a special measuring device.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of selecting and setting one of a plurality of equalization characteristics assigned to an amplitude equalizer, comprising the steps of:

(a) generating a plurality of reference signals each having a different predetermined frequency and being at the same signal level, and feeding said reference signals to a transmission line;
(b) separating the respective reference signals received over the transmission line;
(c) measuring a respective reception level for each of the separated reference signals;
(d) determining level errors between the measured reception levels and sets of estimated reception levels, each set being determined beforehand in association with a respective one of the equalization characteristics and each of the estimated levels corresponding to one of the reference signals; and
(e) selecting and setting one of the equalization characteristics that is associated with one of the sets of the estimated reception levels having the smallest level error.

2. A method as claimed in claim 1, wherein the estimated reception levels are determined by using loss characteristics of the transmission line that are equalized by the equalization characteristics.

3. A method of selecting and setting a plurality of equalization characteristics assigned to an amplitude equalizer, comprising the steps of:
(a) generating two reference signals each having a different predetermined frequency and being at the same signal level and feeding said reference signals to a transmission line;
(b) separating the reference signals received over the transmission line;
(c) measuring a respective reception level for each of the separate reference signals;
(d) determining a level difference between the reception levels; and
(e) selecting and setting one of the equalization characteristics that is associated with the level difference.

4. An arrangement for selecting and setting one of a plurality of equalization characteristics assigned to an amplitude equalizer, comprising:
(a) reference signal generating means for generating a plurality of reference signals each having a different predetermined frequency and being at the same signal level, and feeding the reference signals to a transmission line;
(b) separating means for separating the respective reference signals received over said transmission line;
(c) level detecting means for measuring a respective reception level for each of the separated reference signals;
(d) error-determining means for determining level errors between the measured reception levels and sets of estimated reception levels, each set being determined beforehand in association with a respective one of the equalization characteristics each of the estimated levels corresponding to one of the reference signals; and
(e) means for selecting and setting one of the equalization characteristics that is associated with one of the sets of estimated reception levels having the smallest level error.

5. An arrangement as claimed in claim 4, wherein said reference signal generating means comprises a plurality of oscillators each for generating a reference signal having a different predetermined frequency and the same signal level and an adder for adding output signals of said oscillators.

6. An arrangement as claimed in claim 4, wherein said separating means comprises a band-pass filter.

7. An arrangement as claimed in claim 4, wherein said error-determining means comprises:
storing means for storing the estimated reception levels;
reading means for reading the estimated reception levels from said storing means; and
error calculating means for producing the errors from the reception levels and the estimated reception levels each of which is read from said storing means in association with a respective one of the reception levels.

8. An arrangement for selecting and setting a plurality of equalization characteristics assigned to an amplitude equalizer, comprising:
(a) reference signal generating means for generating two reference signals each having a different predetermined frequency and being at the same signal level, and feeding the reference signals to a transmission line;
(b) separating means for separating the reference signals received over the transmission lines;
(c) level detecting means for measuring a respective reception level for each of the separated reference signals;
(d) means for determining a level difference between the reception levels; and
(e) means for selecting and setting one of the equalization characteristics that is associated with the level difference.

9. A method of selecting and setting one of a plurality of equalization characteristics assigned to an amplitude equalizer, comprising the steps of:
(a) generating a plurality of reference signals each having a different predetermined frequency and being at the same signal level, and feeding said reference signals to a transmission line;
(b) separating the respective reference signals received over the transmission line;
(c) measuring a respective reception level for each of the separated reference signals;
(d) determining level errors between the measured reception levels and estimated reception levels, each of which is determined beforehand in association with a respective one of the equalization characteristics, the estimated reception levels being determined by using loss characteristics of the transmission lines that are equalized by the equalization characteristics, each level error comprising a differential square sum of the measured reception level and the estimated reception level associated with the measured reception level; and
(e) selecting and setting one of the equalization characteristics that is associated with one of the estimated reception levels having the smallest level error.

10. An arrangement for selecting and setting one of a plurality of equalization characteristics assigned to an amplitude equalizer, comprising:
(a) reference signal generating means for generating a plurality of reference signals each having a different predetermined frequency and being at the same signal level, and feeding the reference signals to a transmission line;

(b) separating means for separating the respective reference signals received over said transmission line;
(c) level detecting means for measuring a respective reception level for each of the separated reference signals;
(d) error-detecting means for determining level errors between the measured reception levels and estimated reception levels, each of which is determined beforehand in association with a respective one of the equalization characteristics, said error detecting means comprising storing means including a read only memory (ROM) for storing the estimated reception levels, reading means for reading the estimated reception levels from said storing means, and error calculating means for producing the errors from the measured reception levels and the estimated reception levels, each of which is read from said storing means in association with a respective one of the reception levels; and
(e) means for selecting and setting one of the equalization characteristics that is associated with one of the estimated reception levels having the smallest level error.

11. An arrangement as claimed in claim 10, wherein said reading means comprises means for generating addresses of said ROM and distributing means for distributing the estimated reception levels read out of said ROM to said error calculating means.

12. An arrangement as claimed in claim 10, wherein said error calculating means comprises:
means for determining differences between the reception levels and the estimated reception levels each of which is associated with a respective one of the reception levels;
means for squaring each of the differences; and
means for summing the squared differences.

* * * * *